US005835854A

United States Patent [19]

Palisson et al.

[11] Patent Number: 5,835,854

[45] Date of Patent: Nov. 10, 1998

[54] TRAFFIC INFORMATION SYSTEM COMPRISING A MULTILINGUAL MESSAGE GENERATOR

[75] Inventors: François V. G. Palisson, Herblay; Jean-Marc Patillot, Rambouillet, both of France

[73] Assignee: VDO Control Systems, Inc., Chesire, Conn.

[21] Appl. No.: 652,397

[22] Filed: May 23, 1996

[30] Foreign Application Priority Data

May 31, 1995 [FR] France .................................. 95 06479

[51] Int. Cl.[6] .................................................... H04B 17/02

[52] U.S. Cl. .................................... 455/186.1; 455/152.1; 455/158.5; 455/345; 704/8

[58] Field of Search ................................ 455/161.2, 145, 455/179.1, 185.1, 186.2, 37.1, 186.1, 152.1, 158.5, 345; 395/760; 704/4, 8, 10

[56] References Cited

U.S. PATENT DOCUMENTS

| | | | |
|---|---|---|---|
| 4,597,055 | 6/1986 | Hashimoto et al. | 704/5 |
| 5,175,684 | 12/1992 | Chong | 704/4 |
| 5,345,607 | 9/1994 | Liman et al. | 455/186.1 |
| 5,408,692 | 4/1995 | Suzuki et al. | 455/186.1 |
| 5,471,662 | 11/1995 | Shiota | 455/186.1 |
| 5,497,319 | 3/1996 | Chong et al. | 704/2 |

FOREIGN PATENT DOCUMENTS 4292100 10/1992 Japan .

*Primary Examiner*—William A. Cuchlinski, Jr.
*Assistant Examiner*—Gertrude Arthur
*Attorney, Agent, or Firm*—Richard A. Speer; Mayer Brown & Platt

[57] ABSTRACT

An RDS/TMC receiver or a traffic guidance system includes a unit for indicating on a display (10) or by speech synthesis (20, 4, 5) proper names or place names, for example, alternately in the language of the user and in the language of the country the user travels through, while the other words of the message are indicated only in the user's language. The translations are found in a memory (23).

The guidance system may be used, for example, a guiding and/or information system for the motorist.

14 Claims, 1 Drawing Sheet

TRAFFIC INFORMATION SYSTEM COMPRISING A MULTILINGUAL MESSAGE GENERATOR

FIELD OF THE INVENTION

The present invention relates to a system intended to issue messages formed on the basis of digital codes which codes designate each a vocabulary element relating to the route a user is likely to follow, comprising at least two permanent memory areas of vocabulary which correspond each to a different language.

Such a system is used in the field of motor vehicles.

BACKGROUND OF THE INVENTION

A system corresponding to the one mentioned in the opening paragraph is known from the document JP-A-4-292100. The system described in that document is a car radio receiver suitable for receiving RDS messages, which receiver has various permanent memory areas of vocabulary, which areas correspond each to a different language, and which receiver selects the memory corresponding to the language of the country the vehicle is in, which country it knows from the PI codes received from the RDS transmitter.

SUMMARY OF THE INVENTION

When a user of a motor vehicle drives abroad and wishes to use messages relating to the route he is going to follow, he still runs the risk of meeting with a difficulty which can be illustrated by a specific example. Let us suppose that this user is driving in Belgium on his way to France and that a message that interests him relates to the French town of Lille. If the user has chosen to listen to the messages in French, he will wait for "Lille" but, unfortunately for him, the road signs he meets carry the indications in Flemish, that is, for this town "Rijsel", which he runs the risk of not understanding.

It is an object of the invention, for example, to meet with this difficulty.

A system according to the invention is characterized in that it comprises means for calling up certain words from one of the memory areas that corresponds to one language, on the basis of a digital code, and after that from another area that corresponds to another language, so as to display or announce this same word successively in either one of the two languages.

Preferably, the system comprises means for calling up all the message elements relating to ordinary vocabulary elements in a given memory area that corresponds to one language, and for calling up other vocabulary elements that are likely to appear on road signs successively from two memory areas which correspond to two different languages.

Thus the user is capable of comprehending the general announcement of a message while knowing, in addition, the pronunciation or spelling, or both, of a particular word of the language of the country he is driving through. The translation into the language of the country he is driving through is realized, for example, for town names and for certain particular road signs that are useful to comprehend.

In a variant, the system comprises means for calling up each word to be announced or displayed from one of the memory areas that corresponds to one language, on the basis of a digital code, or from another area that corresponds to another language, which depends on the type of this word. Preferably it comprises means for calling up all the message elements relating to ordinary vocabulary elements in a given memory area, and for calling up from another memory area other vocabulary elements which are likely to appear on road signs.

Thus, a message is announced or displayed in the user's language, except for certain words which are announced or displayed in the language of the country that is driven through.

Advantageously, the system according to the invention further comprises means for permitting a user to define a word present in one of the memory areas, means for calling up, on the basis of the word thus defined, the corresponding word from another memory area that contains another language, and means for displaying or announcing this last word.

Thus, the user can know the translation of the word of interest to him upon request.

Preferably, the memory contains with each code the writing characters of a word and also the corresponding phonetic symbols.

Thus, based on a code, the data necessary for a speech synthesis are found directly, which makes it possible to simplify the speech synthesizing system.

In a particular first embodiment, the system is a car radio receiver intended, for example, to process a signal with a function called RDS/TMC, that is to say, a signal comprising digital signals which contain messages formed by said codes on a subcarrier added to a radio signal, and it comprises means for automatically selecting one of the memory areas on the basis of the code called "PI" code in the RDS signals, which area depends on the language of the received radio signal.

In a second particular embodiment the system is a traffic guidance system in which are created from data recorded previously in the system and/or on an optical disc, messages that indicate the route a user is likely to follow.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

The description which follows relates to a car radio intended to receive and utilize signals called RDS/TMC signals. It is evident that a person skilled in the art would know to adapt this description to the case of a navigation system or routing system, for example, of a type known under the name of CARIN or SOCRATES, more particularly, because the part that implements the invention may be the same both in a car radio and in a navigation system.

Figure 1:
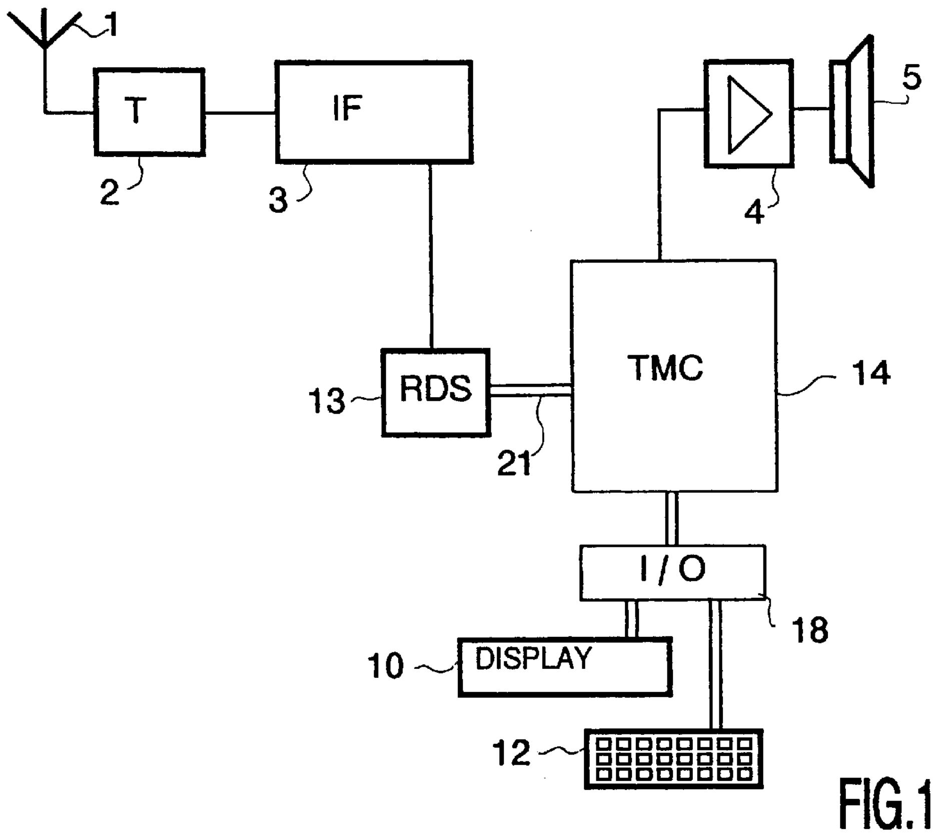
FIG. 1 represents in a diagram a car radio receiver according to the invention.

The receiver of FIG. 1 comprises, apart from an antenna 1, a device 2 (tuner) containing a tuning circuit and a frequency converter followed by a device 3 which contains an intermediate frequency amplifier and a demodulator.

In the system called RDS (Radio Data System), an FM sub-carrier is modulated by digital data signals which can be used for the reception from various transmitters of the same circuit. For processing the signals, the receiver comprises an RDS message decoder 13.

In the case of the known process called TMC (Traffic Message Channel), information messages about the traffic flow are incorporated in certain digital fields of the RDS signals, for example: “3 km tailback before entering Lille”.

For processing the TMC messages, the receiver comprises a module 14 to which the RDS data of the decoder 13 are taken by a bus 21, to be analyzed and stored, as required. In order to issue voiced messages, this module 14 is connected to an audio amplifier system 4 followed by a loudspeaker 5. To permit the display of messages in written form, this module is connected to an input/output interface 18 connected to a display screen 10, for example, a liquid crystal display screen. To ensure an interactivity with the user, the input/output interface 18 is connected to a keyboard 12.

The standard TMC messages are formed by various digital data fields, received in RDS data, and which designate vocabulary elements by a number:

- a first field, of 11 bits, contains a number that designates a vocabulary element (word or word group) describing an event,
- a second field, of 16 bits, contains a number that designates a vocabulary element defining the respective location of the event in question,
- a third field, of 3 bits, contains a data describing an extension of the respective location,
- a fourth field, of 1 bit, describes the direction of the path concerned,
- a fifth field, of 3 bits, indicates the duration of validity of the message,
- a sixth field, of 1 bit, indicates whether it is recommended to take a deviation or not.

The contents of each of the fields are to be handled in a manner to clearly express (in a loud voice or on the display) that which is concerned. Therefore, a permanent memory is provided, in which are stored information signals in clear, in the form of, for example, ASCII codes of the characters of a message to be displayed, and/or the sequence of phonemes (for a memory a phoneme is a sound unit of a language) corresponding thereto, at addresses that correspond to the possible contents of each field, which makes it possible to find back the information signals on the basis of the contents of a field.

For example, the first field (describing an event), which contains 11 bits, is associated to a memory which can contain 2048 vocabulary elements in clear (that is, $2^{11}$ vocabulary elements), each being found at the address defined by the contents of the field. These vocabulary elements are, for example, “tailback”, “road works”, “accident”, etc.

The second field (describing a location), which contains 16 bits, is associated to a memory called location memory, which can contain up to 65526 vocabulary elements (that is, $2^{16}$ vocabulary elements) which comprise full data notably on names of locations, their type, the district to which they belong, the following and preceding points etc., each vocabulary element being in principle found at an address designated by the contents of the field. These vocabulary elements are, for example, “Paris” or “Lille” or “Exit 21” etc. For each country are defined various different databases corresponding to the second TMC field (describing a location) of 65536 elements each, depending on the application. The country concerned is indicated in a code called PI code carried by the RDS data, and the reference of the selected database is indicated in a “system message” which is transmitted from time to time by each RDS/TMC transmitter.

In the third field, various types of extensions are defined. By extension is meant the fact that the event under consideration stretches out, for example, as far as the next location.

In the fourth field, a 0-bit signifies, for example, “direction Paris→Lille”, whereas a 1-bit would mean “direction Lille→Paris” (it is the contents of field 2 that indicate that one is on the road between Paris and Lille, but the direction is not indicated).

Figure 2:
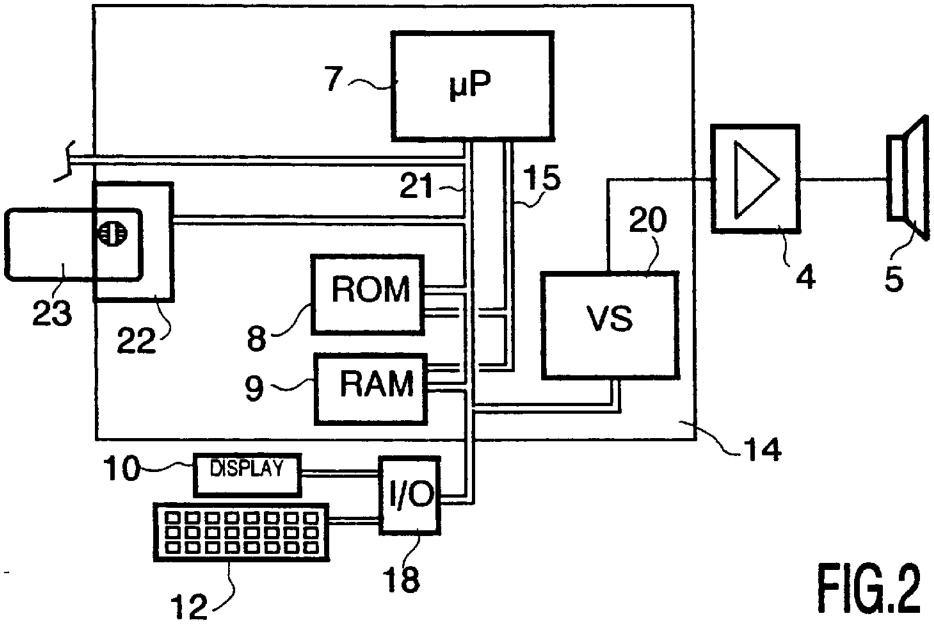
FIG. 2 represents in more detail the part the invention is related to, and its connections to the rest of the system.

In FIG. 2, module 14 comprises a microcontroller 7 which generates control signals and processes the signals leaving the various devices to which it is connected by an address bus 15 and by a data bus 21. The module 14 also comprises various memories:

- a volatile memory 9 called RAM, for storing valid data at a given instant,
- a permanent memory 8, for storing vocabulary descriptions that are fixed non-recurrently by the TMC standard for a given language, corresponding to certain fields, for example, the first field,
- and a memory 22, 23 formed by a memory card reader 22 and a removable memory card 23, for example, of the PCMCIA type, in which are stored more specifically the data corresponding to the second TMC data field and, among other things, for each of the names of the locations provided for a given country, its spelling, for example, in ASCII characters, and the sequence of phonemes corresponding thereto. The memory 23 contains these data in various languages corresponding to the user’s nationality and/or to one or more given districts.

The microcontroller 7 selects and prepares digital data, for example, a sequence of ASCII characters designating message parts, which make it possible for the display screen 10 to display these elements, or symbols designating each a phoneme which make it possible for a voice synthesis module 20 known as such to generate the phonemes in the form of analog signals delivered to the audio amplifier 4 followed by the loudspeaker 5.

When a TMC message arrives, the microcontroller 7 receives from the RDS decoder 13 the contents of the fields and writes them in the memory 9. For display on screen 10 and/or voice transmission of this message, the microcontroller 7 extracts from memory 9 at least the contents of the fields 1, 3, 4 which it interprets in known fashion, among other things, by reading from the memory 8 the constituent parts of the message to be produced to announce the corresponding event in the user’s language, in the form of symbols describing the phonetics of the corresponding announcements.

Then, in a first mode of operation, the microcontroller extracts the second field from memory 9, derives therefrom an address in memory 23 by means of which it reads from this memory the spelling of the name of the location corresponding to the language of the country that is driven through, and the phonemes constituting the name, and it inserts the name written at the suitable location in the message to be displayed to announce the event, and it places the phonemes of the name at the suitable location in the sequence of symbols of phonemes it applies to the generator 20. In this manner it comprises means for calling up a word in one or in the other memory area, depending on the type of this word, that is to say, here in a memory area corresponding to the user’s language for the TMC fields 1, 3, 4, and in a memory area corresponding to the language of the country driven through, for the second TMC field.

In a variant of the operating mode, when the microcontroller extracts the second field from the memory 9, it reads from memory 23, on the one hand, the spelling of the name of the location that corresponds to the user's language and the phonemes forming that name, and, on the other hand, the spelling of the name of the location that corresponds to the language of the country driven through, and the phonemes forming that name. It then inserts, successively, the names in the two languages at the suitable places (with the second name in parentheses, as required) in the message to be displayed to announce the event, and it places the phonemes of the names successively in the two languages (with a link of the type "or rather" or "which is to say" etc. between them) at the suitable places in the symbol sequence of phonemes it conveys to the generator 20.

There may also be a particular key on the keyboard 12 for requesting for a "translation" function. This request may also be formulated by a combination of standard keys of the keyboard 12. The moment the request is formulated, the microcontroller scans the keyboard for reading the name which is typed by the user, or rather it displays on screen 10 a list of names from which the user can select one. Then it searches for this name in the memory, and when it has found the name, it reads the corresponding name in the other language and displays the name on the screen.

The receiver actually comprises means for automatically selecting the desired memory areas on the basis of the PI code, depending on the language of the radio signal received, that is, that of the country travelled through.

The translation functions, as well as those of double announcement and/or double display may also be applied, as required, to vocabulary elements of the other TMC fields, in order to make a better comprehension of certain road signs possible. In effect, the place name signs are not the only ones to be read by the motorist; if a German sign announces "Umleitung beratet", it may be useful for a French motorist to know that this means "déviation conseillée" (deviation recommended)!

It may even be conceived, when the system comprises a graphic display (in CARIN for displaying the maps), that it produces a "translation" of particular road signs of one country which do not exist in another country, in the form of drawings each showing corresponding signs with the equivalents of another country, or an explanatory text associated to the foreign sign in the user's language.

We claim:

1. System intended to form and issue messages formed on the basis of digital codes which codes designate each a vocabulary element relating to a route a user is likely to follow, comprising at least two permanent memory areas of vocabulary which correspond each to a different language, and means for calling up certain words from one of the memory areas that corresponds to one language, on the basis of a digital code, and after that from another area that corresponds to another language, so as to display or announce this same word successively in both of the two languages.

2. A system as claimed in claim 1, further comprising means for calling up message elements relating to ordinary vocabulary elements in a given memory area and for calling up vocabulary elements that are likely to appear on road signs successively from two memory areas which correspond each to a different language.

3. System as claimed in claim 1 further comprising a car radio receiver, for receiving and processing a signal called RDS/TMC signal which comprises digital signals which contain traffic messages formed by said codes; and means for automatically selecting one of the memory areas on the basis of a "PI" code.

4. System intended to form and issue messages on the basis of digital codes which codes designate each a vocabulary element relating to a route a user is likely to follow, comprising at least two permanent memory areas of vocabulary, each of which corresponding to a different language, and means for calling up at least one word from a memory area that corresponds to one language to be displayed and/or announced, on the basis of a digital code, and from another memory area that corresponds to another language, which depends on the type of this word.

5. System as claimed in claim 4, further comprising means for calling up message elements relating to ordinary vocabulary elements in a given memory area, and for calling up vocabulary elements which are likely to appear on road signs from another memory area that corresponds to another language.

6. System intended to form and issue messages based on digital codes which codes designate each a vocabulary element relating to a route a user is likely to follow, comprising at least two permanent memory areas of vocabulary, each of which corresponding to a different language, wherein the system comprises means for permitting a user to define a word present in a memory area that corresponds to one language, means for calling up, on the basis of the word thus defined, a corresponding word from another memory area that contains another language, and means for displaying or announcing the latter word.

7. Message generator module intended for a traffic information system, comprising at least two permanent memory areas of vocabulary, each corresponding to different language, said module comprising means for forming messages on the basis of digital codes which designate each a vocabulary element relating to a route a user is likely to follow, and means for calling up certain words from a memory area that corresponds to one language, on the basis of a digital code, and from another area that corresponds to another language, in order to display and/or announce this same word successively in both languages.

8. Message generator module as claimed in claim 7, further comprising means for calling up message elements relating to ordinary vocabulary elements in a given memory area; and means for calling up vocabulary elements which are likely to appear on road signs successively from two memory areas that correspond each to a different language.

9. Message generator module intended for a traffic information system, comprising at least two permanent memory areas of vocabulary, each of which corresponding to a different language, said module comprising:

means for forming messages on the basis of digital codes which designate each a vocabulary element relating to a route a user is likely to follow;

at least two permanent memory areas of vocabulary, each corresponding to a different language; and means for calling up a word to be displayed and/or announced, on the basis of a digital code, at least one word from a memory area that corresponds to one language, and from another memory area that corresponds to another language, which depends on the type of this word.

10. Message generator module as claimed in claim 9, further comprising it means for calling up message elements that relate to ordinary vocabulary elements in a given memory area, and means for calling up vocabulary elements which are likely to appear on road signs from two memory areas that correspond each to a different language.

11. Message generator module intended for a traffic information system comprising at least two permanent memory areas of vocabulary, each of which corresponding to a different language, said module comprising means for forming messages on the basis of digital codes, each designating a vocabulary element relating to a route a user is likely to follow; and comprising at least two permanent memory areas of vocabulary each corresponding to a different language; means for calling up, on the basis of a word defined by a user and present in a memory area that corresponds to one language, a corresponding word from another memory area that corresponds to another language; and means for displaying and/or announcing at least this last word.

12. A system for issuing messages to a user, said system comprising:

means for forming said messages on the basis of digital codes each designating a vocabulary element relating to a route a user is likely to follow;

a first memory for storing vocabulary elements in a first language;

a second memory for storing vocabulary elements in a second language;

recalling means for selectively recalling vocabulary elements stored in said first memory and for selectively recalling vocabulary elements stored in said second memory; and means for issuing messages containing vocabulary elements from both said first and second memory, whereby said message contains vocabulary elements in at least two languages.

13. A system as claimed in claim 12, wherein said recalling means recalls a particular vocabulary element from said second memory which corresponds to a vocabulary element selected from said first memory, so that when said message is issued, said particular vocabulary element is successively issued in both languages.

14. A system as claimed in claim 12, and including means for recalling a selected vocabulary element from said second memory which corresponds to a vocabulary element issued in said message in said first language, such that said selected word is displayed/announced in said second language after said message has been issued in said first language.

* * * * *